(No Model.)

S. K. RAHN.
HEDGE FENCE.

No. 248,950. Patented Nov. 1, 1881.

WITNESSES:
Jno. R. Woods.
John Lorenz.

Samuel K. Rahn
INVENTOR
by James W. See
ATTORNEY

UNITED STATES PATENT OFFICE.

SAMUEL K. RAHN, OF WEST ELKTON, OHIO.

HEDGE-FENCE.

SPECIFICATION forming part of Letters Patent No. 248,950, dated November 1, 1881.

Application filed April 5, 1881. (No model.)

*To all whom it may concern:*

Be it known that I, SAMUEL K. RAHN, of West Elkton, Preble county, Ohio, have invented certain new and useful Improvements in Hedge-Fences, of which the following is a specification.

Figure 1:
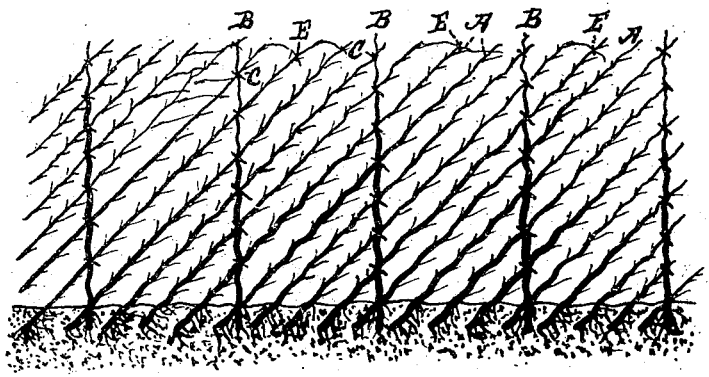
Figure 2:
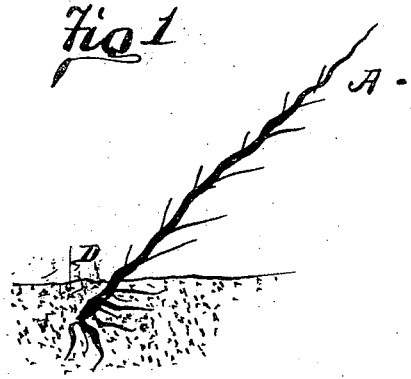
Figure 3:

In the accompanying drawings, Figure 1 represents a hedge-fence constructed in accordance with my invention. Fig. 2 exhibits the method of setting a sprout; and Fig. 3 is a plan of the fence, showing location of uprights.

In Fig. 2, A is one of the hedge-sprouts. It is inclined at any desired angle. The inclination, instead of being produced by bending the sprout during growth, is produced by setting it originally at the angle desired. The growth will then be at such angle. The tendency to straighten is further guarded against by cutting away the roots of the sprout, before setting, on the side of the sprout which is to be upward. The growth of such sprouts develops no openings at the base, as is done by sprouts bent during growth. The latter kind of sprouts have a vertical growth and an angular strain. The vertical portion growing below the bend results, finally, in a base-opening through the fence.

As shown in Fig. 1, the fence is formed of a series of sprouts set as shown in Fig. 2. At proper intervals a sprout, B, is set and trained to grow vertically. These vertical sprouts B form posts which the inclined sprouts will pass, as shown. The inclined sprouts A may be attached in any suitable manner and by any suitable device to such vertical sprouts or posts B as they may pass. The vertical sprouts or posts B are alternately set upon either side of the row of inclined sprouts, as shown in Fig. 3. The tops of the inclined sprouts may be attached to or interwoven with each other, as at E in Fig. 1. The inclined sprouts A will intergrow into a compact and substantial fence even in the absence of the vertical sprouts B, or any artificial attachment to each other or to any support. The only strain met by the growth of the inclined sprouts is that due to the gravity of the sprouts.

I claim as my invention—

1. The improvement in the art of cultivating inclined growth of sprouts which consists in cutting away the roots upon one side of the sprout and setting the sprout in the soil at an inclination with the rootless side uppermost, substantially as and for the purpose set forth.

2. Hedge-fences formed of sprouts having their roots cut away on one side and set at an inclination in the soil with their rootless sides uppermost, substantially as and for the purpose set forth.

SAMUEL K. RAHN.

Witnesses:
J. W. SEE,
JOHN LORENZ.